(12) United States Patent
Cantley et al.

(10) Patent No.: US 11,361,330 B2
(45) Date of Patent: Jun. 14, 2022

(54) PATTERN ANALYTICS SYSTEM FOR DOCUMENT PRESENTMENT AND FULFILLMENT

(71) Applicant: BANK OF AMERICA CORPORATION, Charlotte, NC (US)

(72) Inventors: Kerry Michelle Cantley, Fort Mill, SC (US); Geoffrey Reed Williams, Midlothian, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 503 days.

(21) Appl. No.: 16/109,307

(22) Filed: Aug. 22, 2018

(65) Prior Publication Data

US 2020/0065833 A1 Feb. 27, 2020

(51) Int. Cl.
| | |
|---|---|
| G06Q 30/02 | (2012.01) |
| G06N 20/00 | (2019.01) |
| G06F 16/2457 | (2019.01) |
| H04N 21/478 | (2011.01) |
| G06Q 20/20 | (2012.01) |
| H04L 67/12 | (2022.01) |
| G06Q 30/06 | (2012.01) |

(52) U.S. Cl.
CPC ..... *G06Q 30/0201* (2013.01); *G06F 16/2457* (2019.01); *G06N 20/00* (2019.01); *G06Q 20/202* (2013.01); *G06Q 30/02* (2013.01); *G06Q 30/0613* (2013.01); *H04L 67/12* (2013.01); *H04M 2203/556* (2013.01); *H04M 2215/0104* (2013.01); *H04M 2215/815* (2013.01); *H04N 21/47805* (2013.01)

(58) Field of Classification Search
CPC combination set(s) only.
See application file for complete search history.

(56) References Cited

U.S. PATENT DOCUMENTS

| | | | |
|---|---|---|---|
| 5,134,496 | A | 7/1992 | Schwab et al. |
| 5,315,448 | A | 5/1994 | Ryan |
| (Continued) | | | |

FOREIGN PATENT DOCUMENTS

| | | | |
|---|---|---|---|
| WO | 199321586 | A1 | 10/1993 |
| WO | 199511560 | A1 | 4/1995 |
| (Continued) | | | |

*Primary Examiner* — Crystol Stewart
(74) *Attorney, Agent, or Firm* — Moore & Van Allen PLLC; Nicholas C. Russell (57) ABSTRACT

Systems, computer program products, and methods are described herein for document presentment and fulfillment based on pattern analytics. The present invention is configured to determine one or more resource transfers executed by one or more users, wherein the one or more resource transfers are executed in response to one or more resource transfer requests; retrieve information associated with the one or more resource transfers executed by the one or more users; initiate one or more machine learning algorithms on the retrieved information; determine a pattern associated with the one or more resource transfers executed by the one or more users based on at least the retrieved information; and re-configure the one or more resource transfer requests based on at least the pattern associated with the one or more resource transfers executed by the one or more users.

14 Claims, 2 Drawing Sheets

(56) References Cited

U.S. PATENT DOCUMENTS

| | | | |
|---|---|---|---|
| 5,421,013 A | 5/1995 | Smith | |
| 6,009,170 A | 12/1999 | Sako et al. | |
| 6,272,283 B1 | 8/2001 | Nguyen | |
| 6,314,518 B1 | 11/2001 | Linnartz | |
| 6,351,439 B1 | 2/2002 | Miwa et al. | |
| 6,606,450 B1 | 8/2003 | Klebanoy et al. | |
| 6,643,330 B1 | 11/2003 | Nakagawa et al. | |
| 6,664,976 B2 | 12/2003 | Lofgren et al. | |
| 6,785,814 B1 | 8/2004 | Usami et al. | |
| 6,985,410 B1 | 1/2006 | Furukawa et al. | |
| 7,088,823 B2 | 8/2006 | Fetkovich | |
| 7,098,931 B2 | 8/2006 | Patterson et al. | |
| 7,203,666 B1 | 4/2007 | Gravell et al. | |
| 7,702,585 B2 | 4/2010 | Lyda et al. | |
| 8,508,767 B2 | 8/2013 | Carter et al. | |
| 8,660,949 B2 | 2/2014 | Li et al. | |
| 8,682,479 B1 | 3/2014 | Clupper et al. | |
| 8,724,140 B2 | 5/2014 | Tolomei et al. | |
| 8,768,858 B1 | 7/2014 | Begen | |
| 8,780,382 B2 | 7/2014 | Carter et al. | |
| 8,781,959 B2 | 7/2014 | Lawson et al. | |
| 8,805,576 B1 | 8/2014 | Clupper et al. | |
| 9,064,239 B2 | 6/2015 | Suzuki | |
| 9,311,671 B2 | 4/2016 | Folk et al. | |
| 9,697,493 B2 | 7/2017 | Folk et al. | |
| 10,142,222 B1* | 11/2018 | Zhang | G06F 16/00 |
| 2002/0030907 A1 | 3/2002 | Ikeda et al. | |
| 2002/0131595 A1 | 9/2002 | Ueda et al. | |
| 2003/0126006 A1* | 7/2003 | Kumar | G06Q 30/02 |
| | | | 705/35 |
| 2003/0185125 A1 | 10/2003 | Sako | |
| 2003/0195698 A1 | 10/2003 | Jones | |
| 2003/0215110 A1 | 11/2003 | Rhoads et al. | |
| 2003/0235125 A1 | 12/2003 | Akita | |
| 2004/0008866 A1 | 1/2004 | Rhoads et al. | |
| 2004/0046774 A1 | 3/2004 | Rhoads et al. | |
| 2004/0114907 A1 | 6/2004 | Rinaldi | |
| 2004/0136536 A1 | 7/2004 | Michtchenko | |
| 2005/0271364 A1 | 12/2005 | Collar | |
| 2006/0026627 A1 | 2/2006 | Yang et al. | |
| 2006/0168630 A1 | 7/2006 | Davies | |
| 2007/0033360 A1 | 2/2007 | Kori et al. | |
| 2008/0077525 A1* | 3/2008 | Willey | G06Q 20/102 |
| | | | 705/40 |
| 2008/0101679 A1 | 5/2008 | Rauh et al. | |
| 2008/0239366 A1 | 10/2008 | Cyman et al. | |
| 2008/0260199 A1 | 10/2008 | Cowburn | |
| 2008/0312952 A1 | 12/2008 | Gulfo et al. | |
| 2009/0010550 A1 | 1/2009 | Chang et al. | |
| 2010/0131407 A1 | 5/2010 | Folk | |
| 2010/0312593 A1 | 12/2010 | Johnston et al. | |
| 2012/0157042 A1* | 6/2012 | McCanna | H04M 15/83 |
| | | | 455/407 |
| 2012/0320408 A1 | 12/2012 | Evevsky | |
| 2013/0097080 A1 | 4/2013 | Smets et al. | |
| 2014/0236672 A1* | 8/2014 | Yoder | G06Q 30/0255 |
| | | | 705/7.29 |
| 2014/0293986 A1* | 10/2014 | Drennan | H04W 40/20 |
| | | | 370/338 |
| 2015/0220999 A1* | 8/2015 | Thornton | G06Q 30/0201 |
| | | | 705/14.66 |
| 2015/0332292 A1* | 11/2015 | Unser | G06Q 30/02 |
| | | | 705/7.31 |
| 2016/0055222 A1 | 2/2016 | Sarferaz | |
| 2016/0098876 A1 | 4/2016 | Oz et al. | |
| 2017/0041213 A1* | 2/2017 | Nadalin | H04L 45/22 |
| 2017/0124631 A1* | 5/2017 | Bhandari | G06Q 30/0633 |
| 2017/0193428 A1 | 7/2017 | Abrams et al. | |
| 2017/0206545 A1* | 7/2017 | Gupta | H04L 51/12 |
| 2018/0131628 A1 | 5/2018 | Castinado et al. | |
| 2018/0144339 A1* | 5/2018 | Beidas | G06Q 30/06 |
| 2018/0315141 A1 | 11/2018 | Hunn et al. | |
| 2019/0034915 A1 | 1/2019 | Van Wiemeersch et al. | |
| 2019/0068627 A1* | 2/2019 | Thampy | G06N 20/20 |
| 2019/0075141 A1* | 3/2019 | Albouyeh | H04L 43/08 |
| 2020/0058025 A1* | 2/2020 | Raw | G06Q 20/407 |

FOREIGN PATENT DOCUMENTS

| | | |
|---|---|---|
| WO | 199515635 A1 | 6/1995 |
| WO | 2005098832 A2 | 10/2005 |

* cited by examiner

PATTERN ANALYTICS SYSTEM FOR DOCUMENT PRESENTMENT AND FULFILLMENT

FIELD OF THE INVENTION

The present invention embraces a pattern analytics system for document presentment and fulfillment.

BACKGROUND

Print and mail services are expensive, and the cost of document-based communication is continually increasing. This places a significant burden on entities with extensive document-based communications requirements. There is a need for a system to optimize such print and mail services to ensure effective communications over any delivery channel.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for document presentment and fulfillment based on pattern analytics is presented. The system comprises at least one non-transitory storage device; and at least one processing device coupled to the at least one non-transitory storage device, wherein the at least one processing device is configured to: determine one or more resource transfers executed by one or more users, wherein the one or more resource transfers are executed in response to one or more resource transfer requests; retrieve information associated with the one or more resource transfers executed by the one or more users; initiate one or more machine learning algorithms on the retrieved information; determine a pattern associated with the one or more resource transfers executed by the one or more users based on at least the retrieved information; and re-configure the one or more resource transfer requests based on at least the pattern associated with the one or more resource transfers executed by the one or more users.

In some embodiments, the at least one processing device is configured to: electronically receive information associated with the one or more resource transfers executed by the one or more users, wherein the information comprises at least one or more time periods associated with each of the one or more resource transfers, a transfer amount associated with each of the one or more resource transfers, and one or more communication channels associated with each of the one or more resource transfers.

In some embodiments, each of the one or more time periods corresponds to an amount of time that has lapsed between the one or more users receiving the one or more resource transfer requests and the one or more users executing the one or more transfers in response to the one or more resource transfer requests.

In some embodiments, the one or more communication channels comprises at least one a mail order, a telephone order, an electronic commerce order, an automated teller machine (ATM) order, or a face-to-face order.

In some embodiments, the at least one processing device is further configured to determine, based on the one or more machine learning algorithms, one or more recurring elements associated with the execution of the one or more resource transfers by the one or more users in response to the one or more resource transfer requests.

In some embodiments, the one or more recurring elements is associated with at least the one or more time periods associated with each of the one or more resource transfers, a transfer amount associated with each of the one or more resource transfers, and one or more communication channels associated with each of the one or more resource transfers.

In some embodiments, the at least one processing device is further configured to determine a geographic region associated with the one or more users based on at least the one or more recurring elements.

In some embodiments, the at least one processing device is further configured to re-configure the one or more resource transfer requests based on at least the geographic region associated with the one or more users.

In another aspect, a computer program product for document presentment and fulfillment based on pattern analytics is presented. The computer program product comprises a non-transitory computer-readable medium comprising code causing a first apparatus to: determine one or more resource transfers executed by one or more users, wherein the one or more resource transfers are executed in response to one or more resource transfer requests; retrieve information associated with the one or more resource transfers executed by the one or more users; initiate one or more machine learning algorithms on the retrieved information; determine a pattern associated with the one or more resource transfers executed by the one or more users based on at least the retrieved information; and re-configure the one or more resource transfer requests based on at least the pattern associated with the one or more resource transfers executed by the one or more users.

In yet another aspect, a computer implemented method for document presentment and fulfillment based on pattern analytics is presented. The method comprises determining, using a computing device processor, one or more resource transfers executed by one or more users, wherein the one or more resource transfers are executed in response to one or more resource transfer requests; retrieving, using a computing device processor, information associated with the one or more resource transfers executed by the one or more users; initiating, using a computing device processor, one or more machine learning algorithms on the retrieved information; determining, using a computing device processor, a pattern associated with the one or more resource transfers executed by the one or more users based on at least the retrieved information; and re-configuring, using a computing device processor, the one or more resource transfer requests based on at least the pattern associated with the one or more resource transfers executed by the one or more users.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

As used herein, the term "resource" will generally refer to hardware devices, software applications, objects, products, goods, commodities, services, and the like, and/or the ability and opportunity to access and use the same. Some example implementations herein contemplate one or more accounts, a line of credit associated with the one or more accounts including, but not limited to, demand loan, special purpose, export packing credit, term loan, discounting, purchase of commercial bills, traditional revolving credit card account, or the like. Examples of resources associated with accounts may be accounts that have cash or cash equivalents, commodities, and/or accounts that are funded with or contain property, such as safety deposit boxes containing jewelry, art or other valuables, a trust account that is funded with property, or the like. Examples of resources that may not necessarily be associated with accounts may be particularized goods, such as, devices, equipment, or other valuables, or the like. Similarly, "funds" or "available balance" refer to types of resources. For example, the term "fund" may be used to refer to one or more sets of monetary resources available to a user, and may also be referred to as an available balance, a collected balance, good funds, and usable funds.

Figure 1:
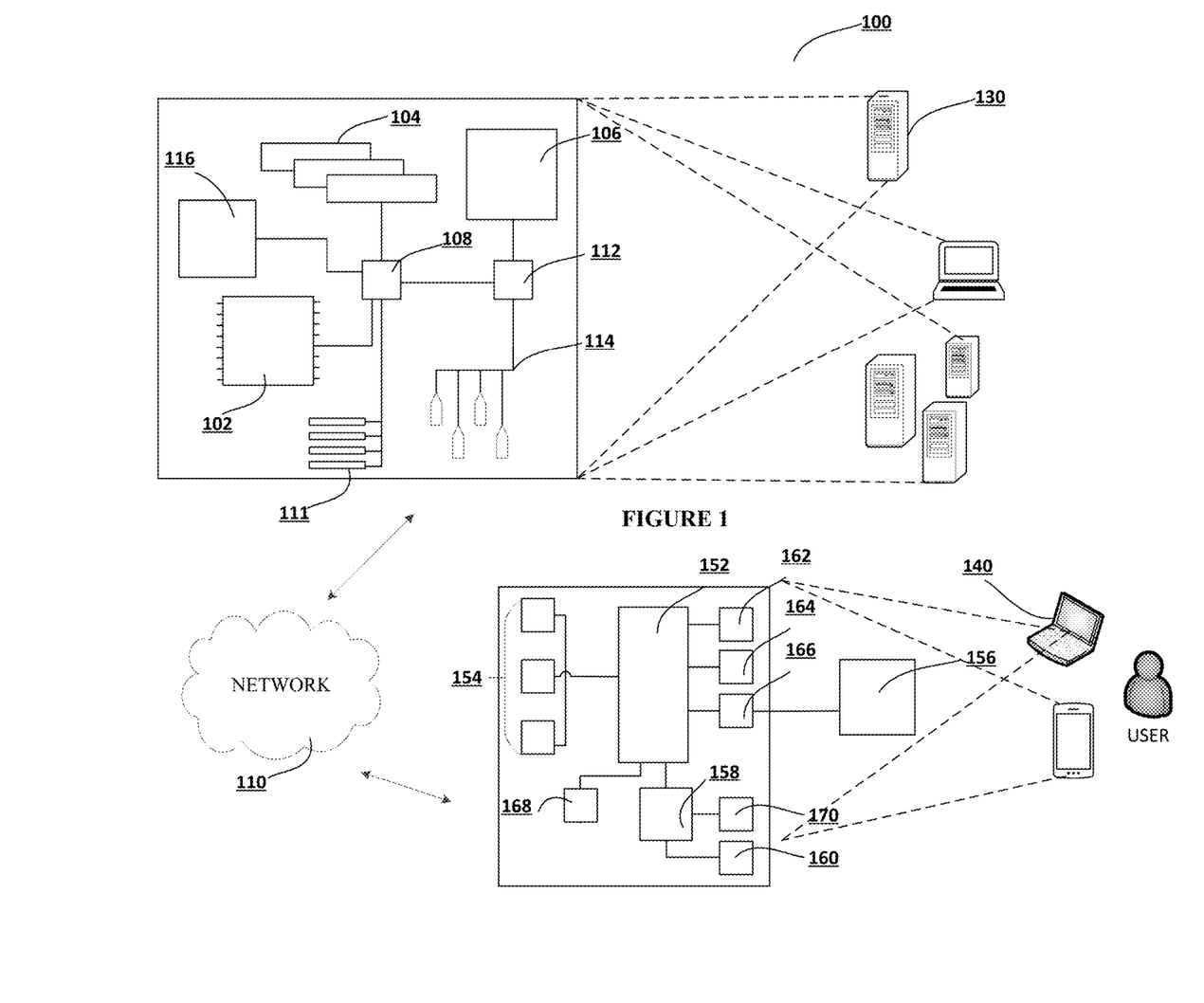
FIG. 1 illustrates technical components of a system for document presentment and fulfillment based on pattern analytics, in accordance with an embodiment of the invention.

FIG. 1 presents an exemplary block diagram of the system environment for document presentment and fulfillment based on pattern analytics 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Print and mail services are expensive, and the cost of document-based communication is continually increasing. This places a significant burden on entities with extensive document-based communications requirements. The present invention provides the functional benefit of optimizing print and mail services to ensure effective communications over any delivery channel by optimizing each phase of document presentment and fulfillment. In this regard, the present invention identifies customer patterns with respect to payment of financial statements. This includes, but is not limited to, time period associated with the payment, a communication channel associated with the payment request, a communication channel associated with the payment transfer, or the like. To this extent, the present invention may track the customer payments over time to identify trends with respect to the payment requests and transfers, and accordingly configure the payment request and transfer options.

Figure 2:
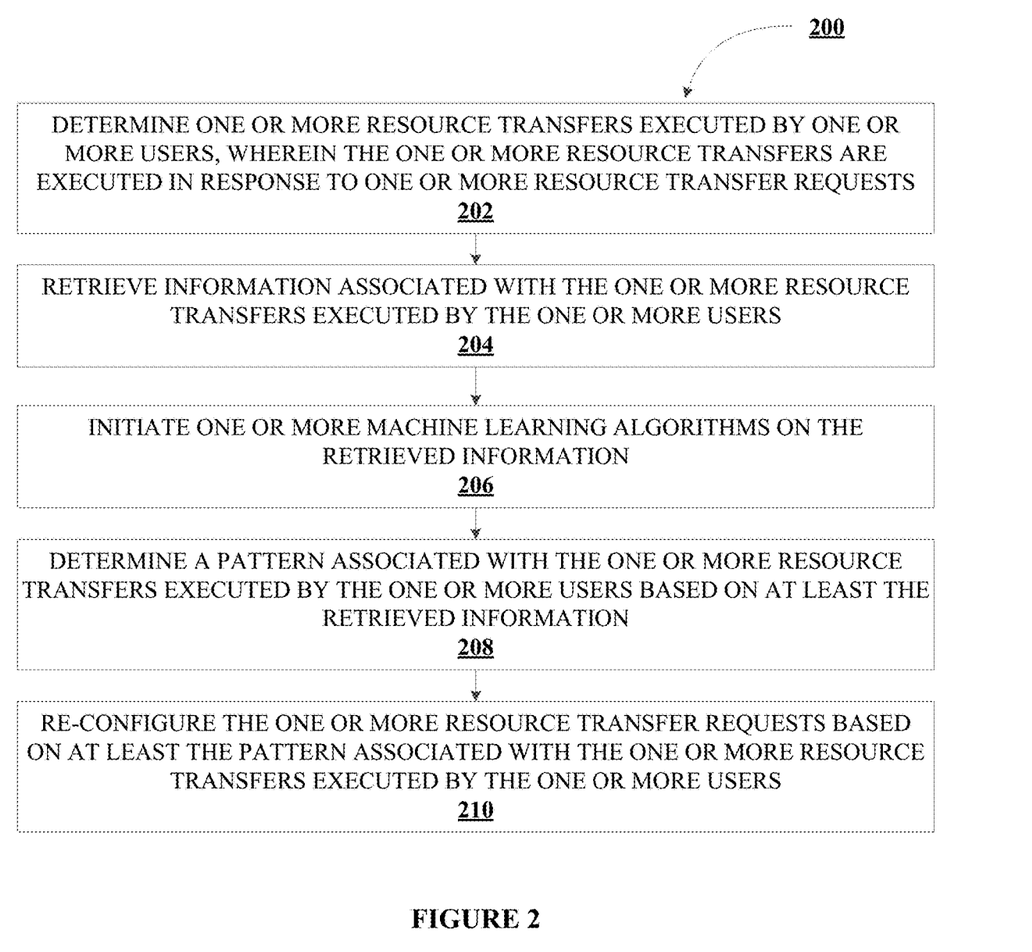
FIG. 2 illustrates a process flow for document presentment and fulfillment based on pattern analytics, in accordance with an embodiment of the invention.

FIG. 2 illustrates a process flow for document presentment and fulfillment based on pattern analytics 200, in accordance with an embodiment of the invention. In this regard, the process flow includes determining one or more resource transfers executed by one or more users, wherein the one or more resource transfers are executed in response to one or more resource transfer requests, as shown in block 202. In some embodiments, the system may be configured to receive a request from a user computing device to initiate a resource transfer with an entity. In response to receiving the request, the system may be configured to establish a communication link between the user computing device and a computing device associated with the entity, thereby establishing a data channel between the user and the entity to facilitate the transfer of information. In doing so, the system may be configured to enable the user to execute resource transfers with the entity via the communication link.

In some embodiments, the resource transfer executed by the user is in response to a resource transfer request associated with the entity. In this regard, the entity may communicate a resource transfer request to the user. In one aspect, the entity may communicate the resource transfer request to the user via one or more communication channels. The communication channels may include, but are not limited to, a mail order, a telephone order, an electronic commerce order, an automated teller machine (ATM) order, a face-to-face order, and/or the like. In some embodiments, the user may execute the resource transfer via the same communication channel that the resource transfer request was received. In other embodiments, the user may execute the resource transfer via a different communication channel than the resource transfer request was received. In one aspect, the user may be able to choose the communication channel via which a resource transfer request is received. In some embodiments, each communication channel may be associated with a reconciliation time, and the reconciliation time for each communication channel may be specific to that channel. In one aspect, the reconciliation time may be defined as the amount of time between the execution of the resource transfer and the reconciliation of the resource transfer with the entity.

In one example, the resource transfer request may be a periodic financial statement, which includes, among other things, a summary of financial transactions which have occurred over a given period of time on a financial account held by the user with the entity, including withdrawals and payments. In cases where the user has executed financial transactions using a financial instrument associated with the entity on credit, the period financial statement may indicate a billing amount that is to be paid by the user for the financial transactions executed by the user during the periodic billing period associated with the financial statement. Typically, an entity provides the user with the periodic financial statement on a monthly basis. The billing period of each user may be different depending on a variety of factor such as the date on which the user was approved that line of credit, the date on which the user became a customer of the entity, or the like. Accordingly, each user may receive their periodic financial statement at different times during the month. Further, each periodic financial statement may include a payment due date. Some users prefer to pay the billing amount as soon as they receive the periodic financial statement, and some prefer to pay the billing amount on the due date.

Next, the process flow includes retrieving information associated with the one or more resource transfers executed by the one or more users, as shown in block 204. In some embodiments, the system may be configured to electronically retrieve information associated with the one or more resource transfers executed by the one or more users. This may also include information associated with the one or more resource transfer requests. In one aspect, the information may include at least one or more time periods associated with each of the one or more resource transfers, a transfer amount associated with each of the one or more resource transfers, and one or more communication channels associated with each of the one or more resource transfers. In this regard, the one or more time periods corresponds to an amount of time that has lapsed between the user receiving the one or more resource transfer requests and the one or more users executing the one or more transfers in response to the one or more resource transfer requests. As discussed herein, this time period may be the amount of time the user takes to pay the billing amount. In most cases, the time period is equal to or lesser than the time between when the user receives the periodic financial statement and the due date, since most users make their payments on or before the due date listed on their periodic financial statement. In some other embodiments, the information may also include individual time instances on which the one or more users receive the one or more resource transfer requests, and time instances on which the one or more users execute the one or more resource transfers in response to the one or more resource transfer requests. In some other embodiments, the transfer amount associated with each resource transfer executed by the one or more users is also retrieved. In some instances, the users may have executed a full amount associated with the resource transfer. In this regard, the full amount may be determined based on a transfer amount listed on the resource transfer request. In some embodiments, the resource transfer request may include a full amount and a minimum amount. Accordingly, the retrieved information may also include the transfer amount indicating whether the user has executed the resource transfer for the full amount, the minimum amount, or any other amount not listed on the resource transfer request.

Next, the process flow includes initiating one or more machine learning algorithms on the retrieved information, as shown in block 206. In some embodiments, the machine learning algorithms may implement unsupervised learning techniques to draw inferences from datasets consisting of input data without labeled responses. In some embodiments, the retrieved information is transformed into a dataset that is capable of being accessed by the machine learning algorithm. In this regard, the system may be configured to format the information. In one aspect, formatting the information may refer to merely converting the file format of the information from an initial format to a format capable of being accessed by the algorithms. In another aspect, formatting the information may refer to formatting the consistency of the information themselves. In cases where the aggregation of information associated with resource transfers are from different sources or if the information has been manually updated by multiple associates, formatting the information includes ensuring that all the variables within a given attribute are consistently written. In yet another aspect, formatting the information may refer to rescaling the information with an aim to improve the quality of the information by reducing dimensions and avoiding situations where one of the values overweight the others. Once the information is formatted, the system may be configured to implement the one or more machine learning algorithms. In some embodiments, the machine learning algorithm may implement a clustering algorithm to identify natural clusters associated with the information. In one aspect, the system may be configured to make the number of clusters modifiable and adjust the granularity of the groups. Examples of clustering analysis include, but are not limited to k-means clustering, hierarchical clustering, probabilistic clustering, and/or the like.

Next, the process flow includes determining a pattern associated with the one or more resource transfers executed by the one or more users based on at least the retrieved information, as shown in block 208. In some other embodiments, the system may be configured to implement the machine learning algorithms on information associated with resource transfers, including the communication channel used to execute the resource transfer for each user. In doing so, the system may be configured to define specific clusters associated with the various resource transfers executed by the user over a predetermined period of time. In this way, the system may be configured to predict a time period, a communication channel, and a likelihood of the user executing a full amount associated with the resource transfer.

Based on the example related to periodic financial statements, the machine learning algorithms are implemented on information associated with the periodic financial statements and the payments made by the user in response to the periodic financial statements. In addition, the system may be configured to retrieve information associated with how the user has made the payment. Entities typically have a multitude of available communication channels for the users to make their payments. Examples of such channels include a mail order, a telephone order, an electronic commerce order, an automated teller machine (ATM) order, or a face-to-face order. A user may choose to make payment via any of the aforementioned channels and any other communication channel made available by the entity. By implementing machine learning algorithms on the payments made by the user over a predetermined period of time, the system may be configured to predict information about the user's subsequent payments, and identify the time period, the communication channel via which the user prefers to make payments, and the likelihood that the user pays the entirety of the statement balance.

In some other embodiments, the system may be configured to determine, based on the one or more machine learning algorithms, one or more recurring elements associated with the execution of the one or more resource transfers by the one or more users in response to the one or more resource transfer requests. In some embodiments, the one or more recurring elements is associated with at least the one or more time periods associated with each of the one or more resource transfers and the one or more communication channels associated with each of the one or more resource transfers executed by the one or more users. As described herein, the clusters identified by the machine learning algorithm may be able to group the users into one or more clusters based on the time periods associated with the resource transfers, the likelihood of the user executing a full amount associated with the resource transfer, and the communication channels using which the resource transfers were executed. In some embodiments, the system may be configured to determine a geographic region associated with the one or more users based on at least the one or more recurring elements. In doing so, the system may be configured to cluster the users based not only on the time period and communication channels, but also based on their geographic region.

Next, the process flow includes re-configuring the one or more resource transfer requests based on at least the pattern associated with the one or more resource transfers executed by the one or more users, as shown in block 210. In this regard, the system may be configured to re-configure the one or more resource transfer requests by predicting a subsequent resource transfer of the user based on the pattern associated with the one or more resource transfers executed by the one or more users. In some embodiments, the system may be configured to re-configure the one or more resource transfer requests based on at least the geographic region associated with the one or more users. In accordance with the example of periodic financial statements, entities may recognize, based on the identified clusters, that regardless of when the users received their financial statements, they typically paid them off within a specific period of time. In another scenario, the entities may recognize, based on the recurring pattern of payment, that users in a specific geographic region typically make payments towards their periodic financial statements on the same day or within a few days of each other, but receive their financial statements are widely varying times. With the increasing cost of document-based communication and a large customer base, it is inefficient and expensive for an entity to initiate print and mail services for financial statements for each user at different times while receiving payments on the same day or within a few days of each other. Accordingly, the system may be configured to re-configure the resource transfer requests (financial statements) to be printed and mailed to the identified cluster of users on days where the print and mail services achieve an optimal balance between postage and logistic costs and delivery fulfillment to the users within a desired time frame.

In some embodiments, re-configuring the resource transfer requests may also include determining an optimal date and time to provide a notification to the user to execute the resource transfer. In one example, the system may identify that the user has a pattern of making payments on a Friday, regardless of the week of the month. In such situations, if the financial statement is typically communicated to the user based on a specific date of the month, the system may be configured to re-configure the financial statement to be communicated to the user based on a specific day of the week (such as the first Monday of each month), to ensure that the user executed the payment transfer earlier in the month. In some other embodiments, the notification may be a message transmitted to the user to indicate an upcoming resource transfer. In one aspect, the message may be transmitted via a text, an email, a pop-up message within the online banking platform, a physical mail, or the like. By identifying a pattern that the user typically executes a resource transfer on a particular day on the month, the system may be configured to transmit a reminder to the user a predetermined period of time prior to the identified day to ensure that the user is reminded of the resource transfer, thereby reducing exposure to the entity and ensuring a timely transfer of resources.

In some embodiments, re-configuring the resource transfer requests may also include switching the communication channel via which the resource transfer requests are received by the users. In this regard, the system may be configured to identify a pattern associated with the communication channel that an individual user uses to execute resource transfers, and re-configures the communication channel associated with the resource transfer request accordingly. In one example, if the system identifies a pattern of payment involving online mobile banking based payments for each financial statement but continues to receive the periodic financial statement via mail, the system may be configured to automatically switch the communication channel to an e-commerce transaction to minimize print and mail costs, and notify the user of the switch. In another example, the system may identify a pattern of use involving print and mail services, where the users receive financial statements via mail and also make their payments via mail. In such situations, the system may be configured to switch the communication channel to on online platform where the user may both receive financial statements and make payments towards the statements online, thereby reducing the need for printing and mailing services. In this regard, the system may be configured to encourage the user to switch the communication channel to an online platform by providing offers and discounts to affiliated merchants, or other products and services within the entity.

In some embodiments, the system may be configured to initiate the printing of a resource transfer request in response to the pattern associated with the one or more resource transfers executed by the one or more users. In this regard, the system may be configured to transmit control signals configured to cause a networked printed to initiate the printing of the resource transfer request. In some embodiments, the printer may be a stand-alone printer which is not yet connected to the network. In response to receiving the control signals, the printer may instantly establish a communication link with the network and begin the printing process. The control signals transmitted to the printer may be received via any one of the wireless or wired technologies discussed herein. In response to initiating the printing of the resource transfer request, the system may be configured to initiate preliminary procedures for mailing the printed resource transfer requests. This may include printing mailing labels for each bundle of resource transfer requests that have been printed.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for document presentment and fulfillment based on pattern analytics, the system comprising:
   at least one non-transitory storage device; and
   at least one processing device coupled to the at least one non-transitory storage device, wherein the at least one processing device is configured to:
      determine one or more resource transfers executed by one or more users, wherein the one or more resource transfers are executed in response to one or more resource transfer requests, wherein the one or more resource transfer requests comprises at least a periodic financial statement, and wherein the one or more resource transfers comprises at least a distribution of funds made by the user in response to the period financial statement;
      aggregate information associated with the one or more resource transfers executed by the one or more users from one or more sources, wherein the information comprises at least an amount of time that has lapsed between the user receiving the one or more resource transfers and executing the distribution of funds in response, one or more communication channels used by the user for the one or more resource transfers, and a transfer amount associated with the one or more resource transfers, wherein information retrieved from each of the one or more sources is associated with a unique format;
      transform the information, wherein transforming further comprises formatting the information to ensure that all variables within a given attribute are consistent;

initiate one or more machine learning algorithms on the transformed information;

determine a pattern associated with the one or more resource transfers executed by the one or more users based on at least the transformed information, wherein determining further comprises determining one or more recurring elements associated with the execution of the one or more resource transfers, wherein determining further comprises determining that the user has executed the one or more resource transfers via a second communication channel;

determine a geographic region associated with the one or more users based on at least the one or more recurring elements;

determine a likelihood of the user executing the distribution of funds in full in response to the periodic financial statement;

determine that the periodic financial statement is transmitted to the user via a first communication channel; and re-configure the one or more resource transfer requests based on at least the pattern associated with the one or more resource transfers executed by the one or more users, wherein re-configuring further comprises grouping the one or more resource transfer requests to be transmitted to the one or more users based on at least the geographic region associated with the one or more users and the likelihood of the user executing the distribution of funds in full in response to the periodic financial statement, wherein re-configuring further comprises automatically switching the transmission of the periodic financial statement from the first communication channel to the second communication.

2. The system of claim 1, wherein the one or more communication channels comprises at least one a mail order, a telephone order, an electronic commerce order, an automated teller machine (ATM) order, or a face-to-face order.

3. The system of claim 1, wherein the one or more recurring elements is associated with at least the one or more time periods associated with each of the one or more resource transfers, a transfer amount associated with each of the one or more resource transfers, and one or more communication channels associated with each of the one or more resource transfers.

4. The system of claim 1, wherein the at least one processing device is further configured to:

define, using the one or more machine learning algorithms, one or more clusters associated with the one or more resource transfers executed by the user over a predetermined period of time; and determine the pattern associated with the one or more resource transfers based on at least defining the one or more clusters.

5. The system of claim 4, wherein the at least one processing device is further configured to:

predict a subsequent resource transfer for each of the one or more users based on at least the pattern associated with the one or more resource transfers.

6. A computer program product for document presentment and fulfillment based on pattern analytics, the computer program product comprising a non-transitory computer-readable medium comprising code causing a first apparatus to:

determine one or more resource transfers executed by one or more users, wherein the one or more resource transfers are executed in response to one or more resource transfer requests, wherein the one or more resource transfer requests comprises at least a periodic financial statement, and wherein the one or more resource transfers comprises at least a distribution of funds made by the user in response to the period financial statement;

aggregate information associated with the one or more resource transfers executed by the one or more users from one or more sources, wherein the information comprises at least an amount of time that has lapsed between the user receiving the one or more resource transfers and executing the distribution of funds in response, one or more communication channels used by the user for the one or more resource transfers, and a transfer amount associated with the one or more resource transfers, wherein information retrieved from each of the one or more sources is associated with a unique format;

transform the information, wherein transforming further comprises formatting the information to ensure that all variables within a given attribute are consistent;

initiate one or more machine learning algorithms on the transformed information;

determine a pattern associated with the one or more resource transfers executed by the one or more users based on at least the transformed information, wherein determining further comprises determining one or more recurring elements associated with the execution of the one or more resource transfers, wherein determining further comprises determining that the user has executed the one or more resource transfers via a second communication channel;

determine a geographic region associated with the one or more users based on at least the one or more recurring elements;

determine a likelihood of the user executing the distribution of funds in full in response to the periodic financial statement;

determine that the periodic financial statement is transmitted to the user via a first communication channel; and re-configure the one or more resource transfer requests based on at least the pattern associated with the one or more resource transfers executed by the one or more users, wherein re-configuring further comprises grouping the one or more resource transfer requests to be transmitted to the one or more users based on at least the geographic region associated with the one or more users and the likelihood of the user executing the distribution of funds in full in response to the periodic financial statement, wherein re-configuring further comprises automatically switching the transmission of the periodic financial statement from the first communication channel to the second communication.

7. The computer program product of claim 6, wherein the one or more communication channels comprises at least one a mail order, a telephone order, an electronic commerce order, an automated teller machine (ATM) order, or a face-to-face order.

8. The computer program product of claim 6, wherein the one or more recurring elements is associated with at least the one or more time periods associated with each of the one or more resource transfers, a transfer amount associated with each of the one or more resource transfers, and one or more communication channels associated with each of the one or more resource transfers.

9. The computer program product of claim 6, wherein the first apparatus is further configured to:
- define, using the one or more machine learning algorithms, one or more clusters associated with the one or more resource transfers executed by the user over a predetermined period of time; and
- determine the pattern associated with the one or more resource transfers based on at least defining the one or more clusters.

10. The computer program product of claim 9, wherein the first apparatus is further configured to:
- predict a subsequent resource transfer for each of the one or more users based on at least the pattern associated with the one or more resource transfers.

11. A computer implemented method for document presentment and fulfillment based on pattern analytics, the method comprising:
- determining, using a computing device processor, one or more resource transfers executed by one or more users, wherein the one or more resource transfers are executed in response to one or more resource transfer requests, wherein the one or more resource transfer requests comprises at least a periodic financial statement, and wherein the one or more resource transfers comprises at least a distribution of funds made by the user in response to the period financial statement;
- aggregating, using a computing device processor, information associated with the one or more resource transfers executed by the one or more users from one or more sources, wherein the information comprises at least an amount of time that has lapsed between the user receiving the one or more resource transfers and executing the distribution of funds in response, one or more communication channels used by the user for the one or more resource transfers, and a transfer amount associated with the one or more resource transfers, wherein information retrieved from each of the one or more sources is associated with a unique format;
- transforming, using a computing device processor, the information, wherein transforming further comprises formatting the information to ensure that all variables within a given attribute are consistent;
- initiating, using a computing device processor, one or more machine learning algorithms on the transformed information;
- determining, using a computing device processor, a pattern associated with the one or more resource transfers executed by the one or more users based on at least the transformed information, wherein determining further comprises determining one or more recurring elements associated with the execution of the one or more resource transfers, wherein determining further comprises determining that the user has executed the one or more resource transfers via a second communication channel;
- determining, using a computing device processor, a geographic region associated with the one or more users based on at least the one or more recurring elements;
- determining, using a computing device processor, a likelihood of the user executing the distribution of funds in full in response to the periodic financial statement;
- determine that the periodic financial statement is transmitted to the user via a first communication channel; and
- re-configuring, using a computing device processor, the one or more resource transfer requests based on at least the pattern associated with the one or more resource transfers executed by the one or more users, wherein re-configuring further comprises grouping the one or more resource transfer requests to be transmitted to the one or more users based on at least the geographic region associated with the one or more users and the likelihood of the user executing the distribution of funds in full in response to the periodic financial statement, wherein re-configuring further comprises automatically switching the transmission of the periodic financial statement from the first communication channel to the second communication.

12. The method of claim 11, wherein the one or more communication channels comprises at least one a mail order, a telephone order, an electronic commerce order, an automated teller machine (ATM) order, or a face-to-face order.

13. The method of claim 11, wherein the method further comprises:
- defining, using the one or more machine learning algorithms, one or more clusters associated with the one or more resource transfers executed by the user over a predetermined period of time; and
- determining the pattern associated with the one or more resource transfers based on at least defining the one or more clusters.

14. The method of claim 13, wherein the method further comprises:
- predicting a subsequent resource transfer for each of the one or more users based on at least the pattern associated with the one or more resource transfers.

* * * * *